United States Patent
Veine et al.

(10) Patent No.: US 7,850,235 B2
(45) Date of Patent: Dec. 14, 2010

(54) ACTIVE HEAD RESTRAINT SYSTEM WITH ACTUATING SYSTEM FOR A VEHICLE SEAT

(75) Inventors: Eric Veine, Wixom, MI (US); Sai Prasad Jammalamadaka, Novi, MI (US); Mladen Humer, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 243 days.

(21) Appl. No.: 11/873,457

(22) Filed: Oct. 17, 2007

(65) Prior Publication Data

US 2009/0102254 A1    Apr. 23, 2009

(51) Int. Cl.
*B60N 2/42* (2006.01)
(52) U.S. Cl. .............................. 297/216.12; 297/216.14
(58) Field of Classification Search .............. 297/216.1, 297/216.12, 216.14, 284.4
See application file for complete search history.

(56) References Cited

U.S. PATENT DOCUMENTS

| | | | | |
|---|---|---|---|---|
| 4,019,777 | A * | 4/1977 | Hayashi | 297/284.4 |
| 4,576,410 | A * | 3/1986 | Hattori | 297/284.4 |
| 5,011,223 | A * | 4/1991 | Kato | 297/284.1 |
| 5,927,804 | A | 7/1999 | Cuevas | |
| 5,975,637 | A * | 11/1999 | Geuss et al. | 297/391 |
| 6,019,424 | A | 2/2000 | Ruckert et al. | |
| 6,024,406 | A | 2/2000 | Charras et al. | |
| 6,082,817 | A * | 7/2000 | Muller | 297/216.12 |
| 6,250,714 | B1 | 6/2001 | Nakano et al. | |
| 6,312,050 | B1 | 11/2001 | Eklind | |
| 6,354,659 | B1 | 3/2002 | Andersson et al. | |
| 6,375,262 | B1 | 4/2002 | Watanabe | |
| 6,398,299 | B1 | 6/2002 | Angerer et al. | |
| 6,485,096 | B1 | 11/2002 | Azar et al. | |
| 6,499,803 | B2 | 12/2002 | Nakane et al. | |
| 6,520,577 | B2 | 2/2003 | Kitagawa | |
| 6,523,892 | B1 | 2/2003 | Kage et al. | |
| 6,550,865 | B2 | 4/2003 | Cho | |
| 6,568,753 | B1 | 5/2003 | Watanabe | |
| 6,644,740 | B2 | 11/2003 | Holst et al. | |
| 6,702,377 | B2 * | 3/2004 | Nakano | 297/216.12 |
| 6,719,368 | B1 | 4/2004 | Neale | |
| 6,749,256 | B1 | 6/2004 | Klier et al. | |

(Continued)

FOREIGN PATENT DOCUMENTS

DE    3843616 A1    6/1990

(Continued)

*Primary Examiner*—Joseph Edell
(74) *Attorney, Agent, or Firm*—Brooks Kushman P.C.

(57) ABSTRACT

In one embodiment, a vehicle seat has a frame and is adapted to be mounted within a vehicle. The frame has first and second side members. The frame supports a head restraint that is moveable to an extended position providing support during an impact condition. An active head restraint system is connected to the head restraint for moving the head restraint when actuated. A cable is connected to the active head restraint. An impact member has a first end attached to the first side member, an intermediate portion spanning across a lumbar region and a second end extending to and not directly affixed to one of the first and second side members. The impact member is attached to the cable to translate upon receiving an input force from the occupant in response to the impact condition, displacing the cable and actuating the active head restraint system.

18 Claims, 4 Drawing Sheets

U.S. PATENT DOCUMENTS

| | | |
|---|---|---|
| 6,767,064 B2 | 7/2004 | Veine et al. |
| 6,789,845 B2 | 9/2004 | Farquhar et al. |
| 6,789,846 B2 | 9/2004 | Humer et al. |
| 6,824,212 B2 * | 11/2004 | Malsch et al. .......... 297/216.12 |
| 6,837,541 B2 | 1/2005 | Farquhar et al. |
| 6,938,953 B2 | 9/2005 | Haland et al. |
| 6,955,397 B1 | 10/2005 | Humer |
| 6,983,989 B1 | 1/2006 | Veine et al. |
| 6,983,996 B2 | 1/2006 | Svantesson |
| 7,044,545 B2 * | 5/2006 | Ohchi et al. .......... 297/216.12 |
| 7,077,472 B2 | 7/2006 | Steffens, Jr. |
| 2003/0015897 A1 | 1/2003 | Humer et al. |
| 2006/0006709 A1 | 1/2006 | Uno et al. |
| 2006/0033376 A1 | 2/2006 | Takenaka et al. |
| 2006/0071517 A1 | 4/2006 | Humer et al. |
| 2006/0103189 A1 | 5/2006 | Humer et al. |
| 2006/0103190 A1 | 5/2006 | Humer et al. |

FOREIGN PATENT DOCUMENTS

| | | |
|---|---|---|
| DE | 19916094 A1 | 10/2000 |
| DE | 10029312 A1 | 1/2002 |
| DE | 10041528 A1 | 3/2002 |
| JP | 2006168627 A | 6/2006 |

* cited by examiner

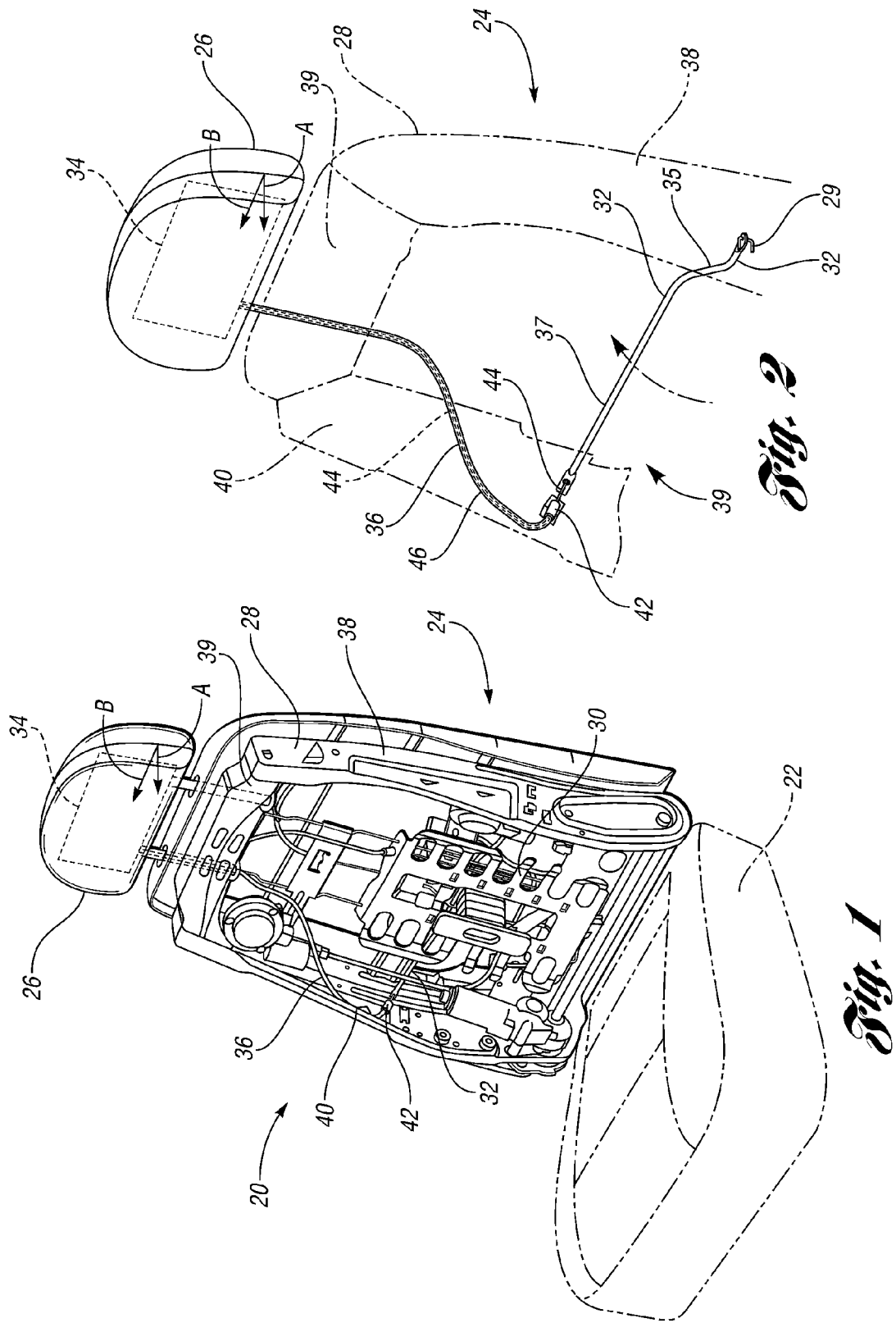

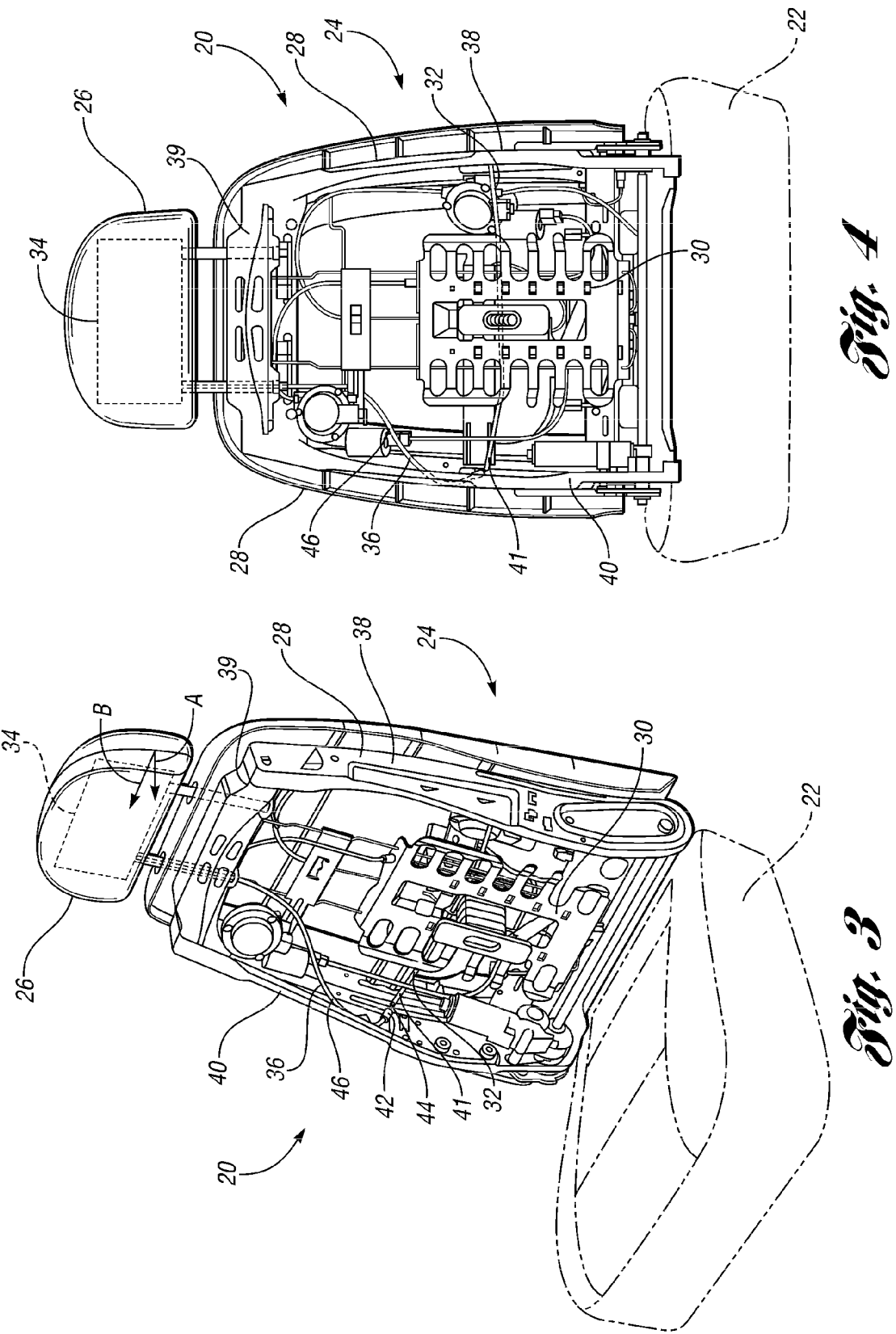

ACTIVE HEAD RESTRAINT SYSTEM WITH ACTUATING SYSTEM FOR A VEHICLE SEAT

BACKGROUND OF THE INVENTION

1. Technical Field

The invention relates to active head restraint systems for vehicle seats.

2. Background Art

Vehicle seats are provided with translatable head restraints for translating to an impact position in response to a force imparted to the seat by an occupant during an impact condition. Examples of vehicle seats having active head restraint systems are disclosed in U.S. Pat. No. 6,767,064 B2, which issued on Jul. 27, 2004 to Veine et al; and U.S. Pat. No. 6,955,397 B1, which issued on Oct. 18, 2005 to Humer, which are incorporated in their entirety by reference herein.

BRIEF DESCRIPTION OF THE DRAWINGS

FIG. 1 is a perspective view of an embodiment of a vehicle seat;

FIG. 2 is a partial perspective view of the vehicle seat of FIG. 1;

FIG. 3 is a perspective view of another embodiment of a vehicle seat;

FIG. 4 is a front elevation view of the vehicle seat in FIG. 3;

DETAILED DESCRIPTION OF EMBODIMENTS OF THE INVENTION

Figures 5, 6:
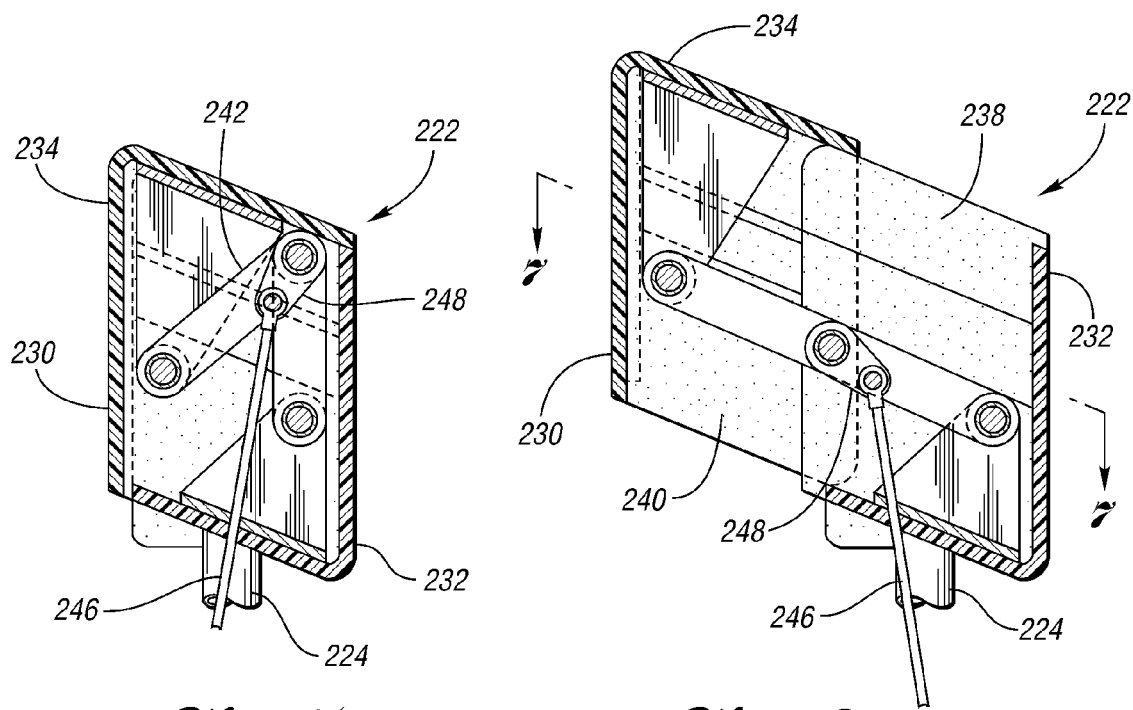
FIG. 5 is a transverse sectional view of a headrest with a contact portion drawn against a base portion, with a tension spring removed for clarity of illustration.
FIG. 6 is a transverse sectional view of the headrest similar to that of FIG. 5, but with the contact portion maximally displaced away from the base portion.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

With reference now to FIG. 1, a vehicle seat is illustrated and is referenced generally by numeral 20. The vehicle seat includes a seat bottom 22 secured to a floor of the associated vehicle for seating an occupant upon the seat bottom 22. A seatback 24 extends from the seat bottom 22 and is secured relative to the seat bottom 22 for supporting the back of the occupant against the seatback 24. The seat 20 also includes a head restraint 26 extending above the seatback 24 for supporting the head of the occupant against the head restraint 26.

In one embodiment, the seatback 24 includes a frame 28 for providing the structural support to the seatback 24. The seatback 24 provides torso support to an occupant by trim wires (not shown) beneath padding (not shown) that are mounted to the frame 28. Additionally, torso support may be provided by an adjustable lumbar support 30 for supporting a lumbar region of the occupant, while providing adjustability so that the occupant can select a desired level of comfort and support. The lumbar support 30 may be proximate to an impact member 32 mounted on the frame 28. In another embodiment, the back of the occupant is supported by a static suspension wire (not shown).

Upon receipt of an impact to the lumbar support 30, such as the body of the occupant that exceeds a predetermined force, the lumbar support 30 may translate the impact member 32 relative to the frame 28. Of course, the impact member 32 may receive the predetermined force directly or indirectly in any suitable manner. In one embodiment, the impact member 32 has multiple components to increase the surface area of the impact member 32 to receive the predetermined force.

In one embodiment, the impact member 32 is connected to an active head restraint system 34 by a cable 36. The impact member 32 and the cable 36 may form an actuation system to actuate the active head restraint system 34. In one embodiment, the impact member 32 translates the cable 36 to actuate the active head restraint system 34, thus translating the head restraint 26 relative to the seatback 24. In another embodiment, the active head restraint 34 expands the head restraint 26 forward relative to the seatback 24, as illustrated by a first arrow A, to support the head of the occupant. In yet another embodiment, the active head restraint 34 moves the head restraint 26 forward and upward relative to the seatback 24, as illustrated by a second arrow B, to support the head of the occupant. Of course, any suitable active head restraint system 34 is contemplated within the scope of the present invention. Further embodiments of head restraints with various active head restraint systems are discussed below with reference to FIGS. 5-6 and 8-9.

In one embodiment, an impact causes the occupant to accelerate into the seatback 24 causing an impact force. After the impact, the occupant is no longer accelerated into the seatback 24 so the impact force is removed from the impact member 32. The removal of the impact force causes the impact member 32 to return to a design position illustrated and release the cable 36 so that the cable 36 triggers the active head restraint system 34 to return the head restraint 26 to the design position illustrated. This movement of the impact member 32 and the cable 36 is automatic once the impact force is removed so that the active head restraint system 34 automatically resets the head restraint 26 to the design position illustrated in FIG. 1.

In another embodiment, the impact of the back of the occupant directly translates the impact member 32, which translates the cable 36 to actuate the active head restraint system 34 and move the head restraint 26. Since the impact member 32 may directly receive the impact of the back of the occupant and the cable 34 directly actuates the active head restraint system 34, overall efficiency may be improved because few components are required to operate the active head restraint system 34. The impact member 32 and the cable 36 produce a reduced amount of friction in comparison to the prior art because of the reduced quantity of moving components. In addition, manufacturing costs may be reduced because fewer components are utilized to actuate the active head restraint system 34. The impact member 32 and the cable 36 generally are light weight and decrease the overall weight of the seatback 24, which is desired for the seatback 24 for use in a vehicle.

The frame 28 has a first side member 38 and a second side member 40 spaced apart by a cross member 39. As illustrated, the cross member 39 is generally at the top of the seatback 24, although any location for the cross member 39, between the first side member 38 and the second side member 40 is contemplated within the scope of the present invention. In one embodiment, the first side member 38, cross member 39 and the second side member 40 are integrally formed as a tube.

In the embodiment illustrated in FIG. 1, the impact member 32 is attached to the frame 28 at a first end to the first side member 38 of the frame 28. Of course, the impact member 32 may be indirectly mounted on the frame 28. For example, the impact member 32 may be mounted on the frame 28 by ways of an intermediate frame.

In an embodiment, the impact member 32 is pivotally connected to the first side member 38 so that the impact member 32 can pivot. In another embodiment, the impact member 32 is anchored to the first side member 38. An intermediate portion of the impact member 32 spans across the seatback 24 towards the second side member 40 to connect to the cable 36 at a second end of the impact member 32. The impact member 32 is not directly mounted on the second side member 40. The cable 36 is mounted to the second side member 40. In one embodiment, the cable 36 is mounted to the second side member 40 with a bracket 42. The bracket 42 allows the cable 36 to translate while securing the cable 36 on one side of the frame 28. Of course, the cable 36 can be mounted to the second side member 40 in any suitable manner within the scope of the present invention.

Referring now to FIG. 2, the impact member 32 is depicted in connection with the cable 36 with other components removed for illustration purposes. The impact member 32 directly receives an impact force from the back of the occupant as the occupant is accelerated into the seatback 24, which may occur under impact conditions such as a rear impact. As the occupant is accelerated into the seatback 24, the back of the occupant pushes the impact member 32 to pivot about an axis provided by pivot pin 29, which is generally parallel to the first side member 38. This motion of the impact member 32 pulls the cable 36 proximate the second side member 40. The cable 36 then actuates the active head restraint 34. The impact member 32 and the cable 36 return to an initial position after the impact condition, allowing for an automatic reset.

In the illustrated embodiment, the impact member 32 is not symmetrical in a lateral direction across the frame 28. The lack of symmetry of the impact member 32 is more efficient because fewer components are required. Utilization of fewer components produces less friction and gives the seatback 24 a lower weight in comparison to the prior art.

In one embodiment, the impact member is a rod 32. The rod 32 may be generally rigid to facilitate translation of the cable 36. In one embodiment, the rod 32 is a metal rod 32. The rod 32 may be made out of any sufficiently rigid material. The rod 32 has a first transverse portion 33 that is pivotally mounted to the first side member 38. The rod 32 has an intermediate portion 35 connected to the first transverse portion 33 and extends rearward relative to the first side member 38. The rod 32 has a second transverse portion 37 connected to the intermediate portion 35 and extending across a lumbar region 39. The second transverse portion 37 receives the impact from the back of the occupant and pulls the cable 36 to actuate the active head restraint system 34. Of course, any suitable impact member 32 is contemplated within the scope of the present invention.

In one embodiment, the cable is a Bowden cable 36. The Bowden cable 36 has a cable member 44 provided within a sheath member 46. The cable member 44 moves within the sheath member 46 and is connected to the impact member 32 at one end and the active head restraint system 34 at a second end. The sheath member 46 is mounted to the second side member 40 at a first end and is mounted within the head restraint 34 at a second end. The sheath member 46 may be mounted to the second side member 40 with the bracket 42, which allows translation of the cable member 44 while affixing the Bowden cable 36 to the frame 28. In one embodiment, the cable member 44 mechanically actuates the active head restraint 34. Of course, the cable member 44 can actuate the active head restraint 34 in any suitable manner and any suitable cable 36 is contemplated within the scope of the present invention.

With reference now to FIGS. 3-4, another embodiment of a vehicle seat 20 illustrated. A seatback 24 of the vehicle seat 20 has a frame 28 with a first side member 38 and a second side member 40, which are interconnected by a cross member 39. An impact member 32 spans from the first side member 38 to the second side member 40. The impact member 32 is mounted to the first side member 38. As illustrated, the impact member 32 spans across the frame 28 as a single continuous impact member 32. In another embodiment, the impact member 32 is anchored to the first side member 38 so that a fixed connection exists. In another embodiment, the impact member 32 is mounted on the second side member 40 at a first end. An intermediate portion of the impact member spans across to the first side member 38 where the impact member 32 is retained in a suitable manner and then spans from the first side member 38 across the lumbar region 39 to the second side member. The impact member 32 may span across from the second side member 40 to the first side member 38 any number of times to increase the travel of the impact member 32. Once the intermediate portion of the impact member 32 spans across the lumbar region 39, the second end of the impact member 32 is not directly mounted to the second side member 40. Of course, the impact member 32 may be mounted on the first side member 38 and span across to the second side member 40 and may span across any desired number of times.

The impact member 32 is connected to a cable 36. The cable 36 is mounted to the second side member 40 at a first end and is connected to the active head restraint system 34. The cable 36 may be mounted to the second side member 40 with a bracket 42 or any other suitable manner to allow translation of the cable 36. In one embodiment, the cable member 36 is covered with a covering 41 so that the cable member 36 does not rub against the padding (not shown) in the seatback 24.

When an occupant is accelerated into the seatback 24, the impact member 32 is displaced to translate the cable 36. The translation of the cable 36 actuates the active head restraint system 34 to deploy. The active head restraint system 34 may expand forward or forward and upward. In one embodiment, the cable 36 mechanically actuates the active head restraint system 34. Of course, any suitable active head restraint system 34 is contemplated within the scope of the present invention. Once an impact force is removed from the impact member 32, the impact member 32 and the cable 36 trigger the head restraint system 34 to translate the head restraint 26 to the design position illustrated in FIGS. 3-4.

In one embodiment, the impact member 32 and the cable 36 are integrally formed, creating a collective cable 32, 36, so that the impact member 32 is a portion of the collective cable 32, 36. The collective cable 32, 36 spans from the first side member 38 of the frame 28 on a first end to the active head restraint system 34 on a second end. In one embodiment, the collective cable is a Bowden cable 32, 36. The Bowden cable 32, 36 has a cable member 44, as illustrated in FIG. 3, provided within a sheath member 46 that is mounted to the second side member 40 at a first end and is mounted within the head restraint 34 at a second end. The cable member 44 is translatable within the sheath member 44 to activate the active head restraint system 34. Of course, any suitable collective cable 32, 36 is contemplated within the scope of the present invention.

Figure 7:
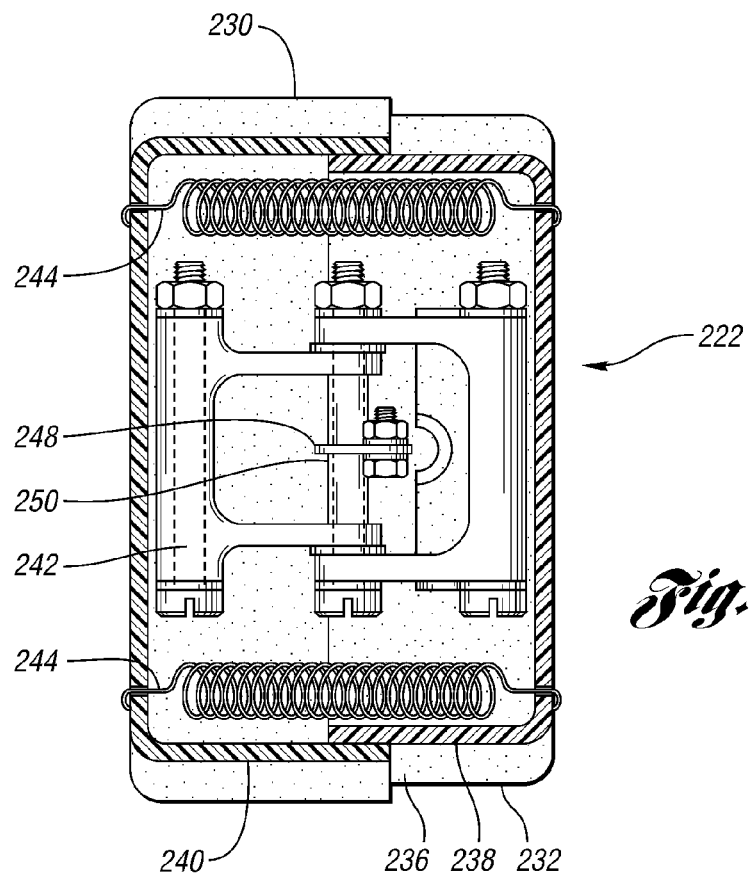
FIG. 7 is a sectional view of the headrest of FIG. 6 taken along the line 7-7 of FIG. 6, further illustrating tension springs urging the contact portion toward the base portion.

As best seen in FIGS. 5-7, a headrest 222 is disclosed and further described in U.S. Pat. No. 6,767,064 B2, which issued on Jul. 27, 2004 to Veine et al. and is herein incorporated by reference. The headrest 222 includes a two-piece housing 230 formed, for example, of a pair of oppositely-opening generally-cup-shaped halves. The first, relatively-rearward half, coupled in a suitable manner to the upper portions of the posts 224, defines a "base portion 232." The second, relatively-forward half defines the occupant-engaging "contact portion 234" of the headrest 222 that is supported on the base portion 232 for relative translational movement on a pair of tracks 236 that are conveniently molded into the opposed, complementary lateral walls 238, 240 of the base and contact portions 232, 234.

As best seen in FIG. 7, an articulated spread-lever arrangement 242 links together the base portion 232 and the contact portion 234, while a pair of tension springs 244 urge the contact portion 234 toward the base portion 232. A Bowden cable 246, illustrated in FIGS. 5-6, is secured by a connecting link 248 to a linkage point 250 of the spread-lever arrangement 242. Thus, upon the suitable tensioning of the Bowden cable 246, the spread-lever arrangement 242 extends to urge the contact portion 234 away from the base portion 232, as resisted by the tension springs 244.

In one embodiment, after the impact force activates the headrest 222 and after the impact force is removed, the pair of tension springs 244 urge the contact portion 234 toward the base portion 232 and the Bowden cable 246 is retracted to return the impact member 32, illustrated in FIGS. 1-4, to the design position.

Figure 8:
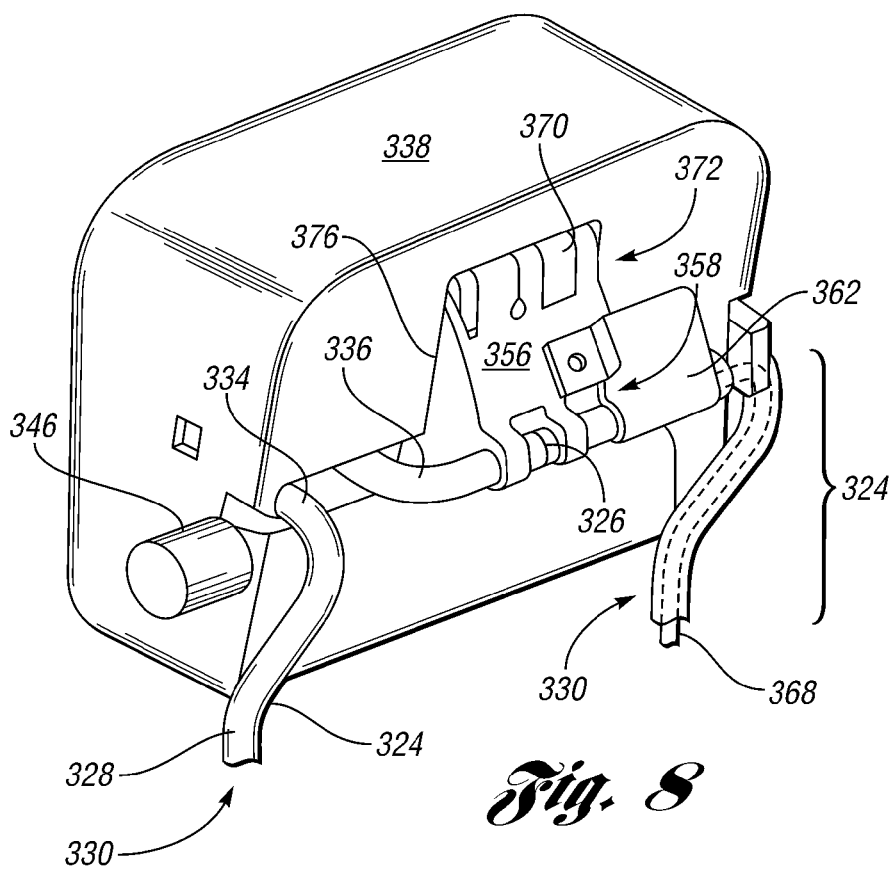
FIG. 8 is a detailed illustration of a head restraint assembly for use in an automotive seat assembly, the head restraint assembly illustrated in the active head restraint element stowed position.
Figure 9:
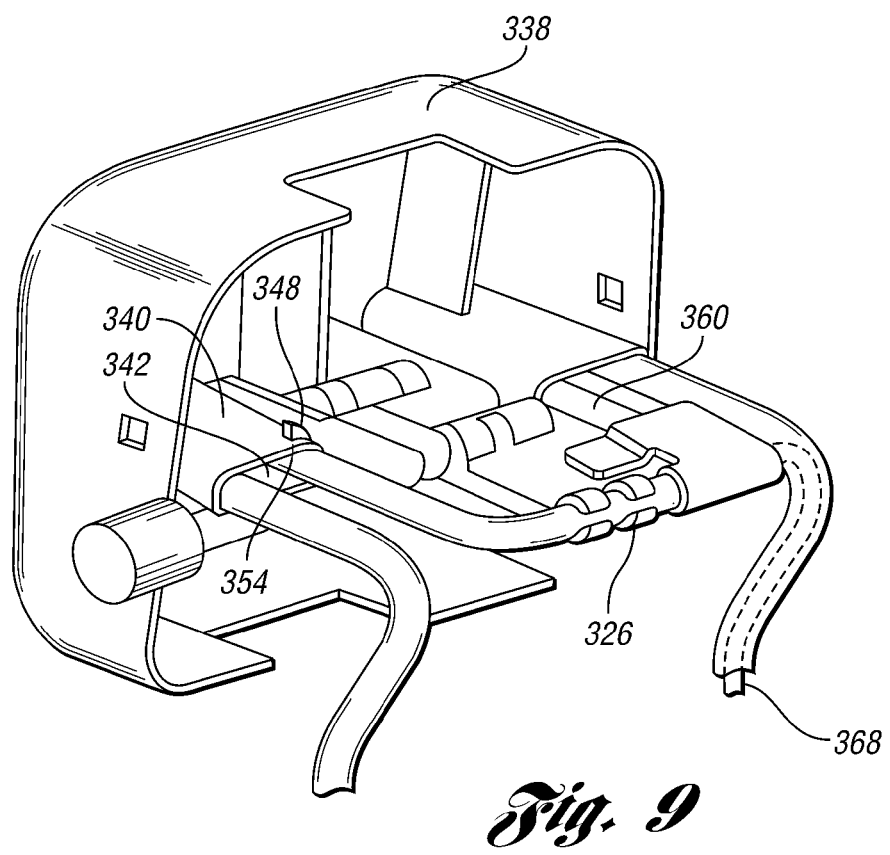
FIG. 9 is a detailed illustration of a head restraint assembly for use in an automotive seat assembly, the head restraint assembly illustrated in the active head restraint element deployed position.

Referring now to FIGS. 8 and 9, an active restraint element 356 is illustrated and further discussed in U.S. Pat. No. 6,983,989 B1, which issued on Jan. 10, 2006 to Veine et al. and is herein incorporated by reference. The active head restraint element 356 is movable between a stowed position 358 (see FIG. 8) and a deployed position 360 (see FIG. 9). The active restraint element 356 moves the head restraint inner structure 338 forward into a head restraint forward position 360 during vehicle impact to engage the passenger's head, which in turn reduces whiplash and related stressors. Although this may be accomplished in a variety of fashions, one embodiment contemplates that the active restraint element 356 is biased towards the deployed position 360. A trigger element 362 is utilized to retain the active head restraint element 356 in the stowed position 358 until the trigger element 362 is activated during vehicle impact. Again, although this may be accomplished in a variety of fashions, one embodiment contemplates the use of a motion translation element 32 positioned within the seatback (as seen in FIGS. 1-4). The motion translation element 32 includes a back intrusion portion which senses the occupant's intrusion into the seatback during vehicle impact. The motion translation element 32 translates the intrusion into a linear force on a cable 368 or similar linkage attached to the trigger element 362. The linkage 368 may be positioned within the head restraint support member 324 when hollow tubing is used to form the head restraint support member 324. The use of unidirectional engagement notches 342 allows the active restraint element 356 to move the head restraint inner surface 338 even if the locking arm 346 is engaged. In alternate embodiments the linkage 368 may be directly connected to the motion translation element 32 (as seen in FIGS. 1-4) and thereby effectuate the movement from stowed 358 to deployed 360 without the requirement of biasing or the use of a trigger element 362.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A vehicle seat comprising:
   a frame for supporting a back of an occupant and adapted to be mounted within a vehicle, the frame having a first side member and a second side member spaced apart from the first side member and interconnected by a cross member;
   a head restraint supported by the frame, the head restraint being moveable relative to the frame to an extended position to provide support to a head of the occupant during an impact condition;
   an active head restraint system operatively connected to the head restraint for moving the head restraint to the extended position when the active head restraint system is actuated;
   a sheath fixed at a first end proximate the active head restraint system and at a second end upon the second side member;
   an inner cable within the sheath, connected to the active head restraint system to translate within the sheath; and
   an impact member extending substantially across the space between the first and second side members and having a first end pivotally connected to the first side member, an intermediate portion extending across a lumbar region and a second end attached to the inner cable and supported thereby to translate relative to the second side member upon receiving an input force from the occupant in response to the impact condition for consequently displacing the inner cable and actuating the active head restraint system.

2. The vehicle seat of claim 1 wherein the impact member pivots about a pivot axis that is generally parallel to the first side member.

3. The vehicle seat of claim 1 wherein the impact member further comprises a rod.

4. The vehicle seat of claim 3 wherein the rod further comprises:
   a first transverse portion pivotally mounted to the first side member at the first end;
   an intermediate portion connected to the first transverse portion extending rearward relative to the first side member; and
   a second transverse portion connected to the intermediate portion and extending across a lumbar region to receive the input force from the occupant and thereby to pivot relative to the first side member.

5. The vehicle seat of claim 1 wherein the impact member extends transversely from the first side member to the second side member.

6. The vehicle seat of claim 1 wherein the sheath is mounted to the second side member with a bracket.

7. The vehicle seat of claim 1 further comprising:
a torso support connected to the frame for supporting a torso of the occupant to distribute the input force from the occupant during the impact condition to the impact member.

8. The vehicle seat of claim 1 wherein the head restraint expands forward relative to the frame in the extended position.

9. The vehicle seat of claim 8 wherein the head restraint translates upward relative to the frame in the extended position.

10. A vehicle seat back comprising:
a frame for supporting a back of an occupant and adapted to be mounted within a vehicle, the frame having a first side member and a second side member spaced apart from the first side member and interconnected by a cross member;
a head restraint supported by the frame, the head restraint being moveable relative to the frame to an extended position to provide support to a head of the occupant during an impact condition;
an active head restraint system operatively connected to the head restraint for moving the head restraint to the extended position when the active head restraint system is actuated;
a sheath fixed at a first end proximate the active head restraint system and at a second end upon the second side member; and
a cable connected to the active head restraint system and extending through the sheath along the second side member and extending transversely across to the first side member, the cable being anchored to the first side member to be displaced relative to the sheath upon receiving an input force from the occupant in response to the impact condition for consequently actuating the active head restraint system.

11. The seat back of claim 10 wherein the cable is a single continuous cable.

12. The seat back of claim 10 wherein the cable further comprises a single continuous cable routed through a bracket mounted to the other of the first side member and the second side member.

13. The seat back of claim 10 wherein the head restraint expands forward relative to the frame in the extended position.

14. The seat back of claim 13 wherein the head restraint translates upward relative to the frame in the extended position.

15. The vehicle seat of claim 10 further comprising a covering provided over the cable between the first side member and the second side member to prevent the cable from rubbing against other components in the vehicle seat.

16. A vehicle seat back comprising:
a frame for supporting a back of an occupant and adapted to be mounted within a vehicle, the frame having a first side member and a second side member spaced apart from the first side member and interconnected with a cross member;
a head restraint supported by the frame, the head restraint being moveable relative to the frame to an extended position to provide support to a head of the occupant during an impact condition;
an active head restraint system operatively connected to the head restraint for moving the head restraint to the extended position when the active head restraint system is actuated;
a sheath fixed at a first end proximate the active head restraint system and at a second end upon the second side member; an inner cable within the sheath, connected to the active head restraint system to translate within the sheath; and an impact member extending substantially across the space between the first and second side members and
having a first end pivotally attached to the first side member and a second end extending to the second side member and not directly affixed to the second side member, the second end of the impact member being attached to the cable and supported thereby to pivot relative to the first side member upon receiving an input force from the occupant in response to the impact condition for consequently displacing the cable and actuating the active head restraint system.

17. The vehicle seat of claim 16 wherein the impact member pivots about a pivot axis that is generally parallel to the first side member.

18. The vehicle seat of claim 17 wherein the impact member further comprises a metal rod.

* * * * *